Dec. 20, 1960  C. L. DISHON  2,964,870
FISHING LURE
Filed June 9, 1959

INVENTOR.
Cyrus L. Dishon

BY Victor J. Evans & Co.

ATTORNEYS

# United States Patent Office 2,964,870
Patented Dec. 20, 1960

2,964,870

FISHING LURE

Cyrus L. Dishon, Wathena, Kans.

Filed June 9, 1959, Ser. No. 819,044

6 Claims. (Cl. 43—42.02)

This invention relates to a fishing lure.

The object of the invention is to provide a fishing lure which includes two members that are movable relative to each other so that as the fishing lure is used in a body of water, a novel and realistic motion will be imparted to the lure which will prove highly attractive and effective for catching fish.

Another object of the invention is to provide a fishing lure which will move through the water in a life like manner to simulate a live bug, insect or the like, wherein various types of fish can be more readily caught, by a hook thereon.

A further object of the invention is to provide a fishing lure which is extremely simple and inexpensive to manufacture.

Other objects and advantages will be apparent during the course of the following description.

In the accompanying drawing, forming a part of this application, and in which like numerals are used to designate like parts throughout the same:

Figure 1:
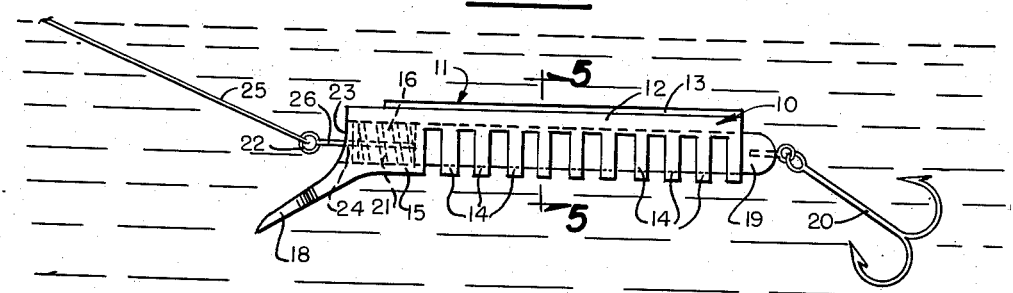
Figure 1 is an elevational view of the fishing lure of the present invention.

Referring in detail to the drawing, the numeral 10 indicates a fishing lure of the present invention which is shown to comprise a body member that is indicated generally by the numeral 11. The body member 11 includes a upper portion 12 which has on its upper end a rib 13 that helps stabilize the device as it moves through the water. Depending from the upper portion 12 of the body member 11 is a plurality of spaced parallel flanges 14. The body member 11 further includes a front end 15 which is provided with an opening 16 that registers with openings 17 in the flanges 14. An inclined spoon 18 extends downwardly from the front end 15 of the body member 11.

Figure 2:
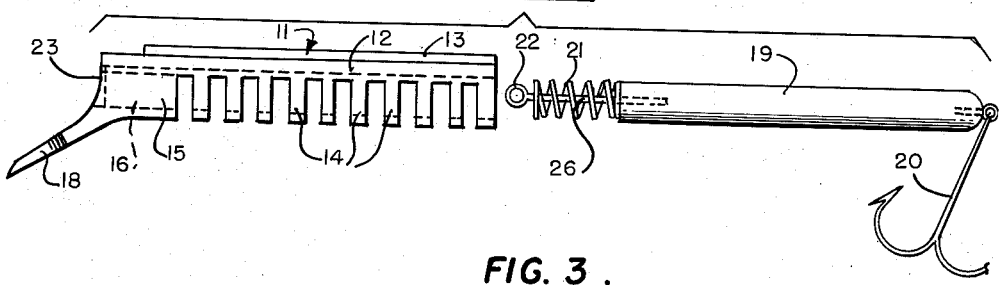
Figure 2 is a view showing the parts disassembled or disconnected.
Figure 3:
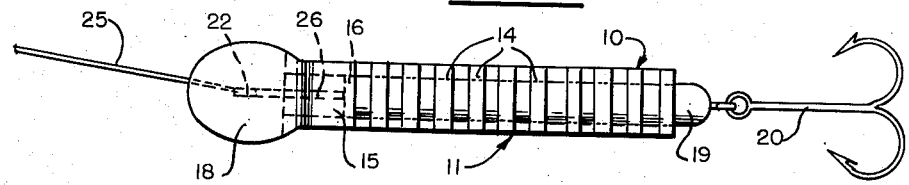
Figure 3 is a bottom plan view.

There is further provided a cylindrical core or piston which extends through the registering apertures or openings 17 and the front end of the core 19 is seated in the recess 16 of the front end 15 of the body member. A fish hook 20 is connected to the rear end of the core 19. The numeral 26 indicates a pin which extends forwardly from the core 19, and which is secured thereto, and the pin 26 is provided with an eye 22 on its front end. A shoulder 23 on the front end of the body member 11 is provided with an aperture or opening 24 through which extends the pin 26, and a coil spring 21 is circumposed on the pin 26, as for example as shown in Figure 2. The numeral 25 indicates a line which is connected to the eye 22 on the pin 26.

Figure 4:
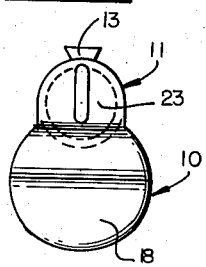
Figure 4 is an end elevational view.
Figure 5:
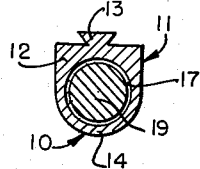
Figure 5 is a sectional view taken on line 5—5 of Figure 1.

From the foregoing, it is apparent that there has been provided a fishing lure, and in use the line 25 is adapted to be connected to the eye 22 on the front end of the pin 26 and the pin 26 extends through the slot or opening 24 and is connected to the front end of the core 19. The core 19 has the fish hook 20 fastened to its rear end, as shown in the drawings, and the core 19 is slidably supported in the openings 17 of the flanges 14. It will be noted that the coil spring 21 is positioned on the pin 26, as for example as shown in Figure 2. The rib 13 which has the shape as shown in Figures 4 and 5 is arranged on the upper end of the body member so as to exert a stabilizing influence on the fishing lure as the fishing lure moves through the water. The spoon 18 helps provide the desired movement to the fishing lure, and it will be seen that as the lure 10 is pulled through the water by means of the line 25, the core 19 is free to slide in the openings 17 and the core 19 can be moved toward or away from the shoulder 23 in the front end of the body member 11. As the core 19 moves forward it compresses the coil spring 21, and then with sufficient pressure or tension on the coil spring 21, the core 19 can move rearwardly so that there will be a more or less continuous shifting or sliding movement of the core 19 with respect to the body member 11. This will produce a novel effect which will be attractive and appealing to fish so that there will be more of a tendency for the fish to be caught on hooks such as the hook 20.

It is to be noted that there are open spaces between the flanges 14 and this arrangement insures that water may enter these open spaces and serve as a lubricant for the sliding core 19.

The parts can be made of any suitable material and in different shapes or sizes.

The fishing lure of the present invention is constructed so that it will give the appearance of a struggling bug or the like which will prove highly attractive to fish. The parts may be made of a material which is not affected by corrosion from the water and the parts may be suitably colored in order to enhance the attractiveness thereof. The slot 24 in the front end of the body member 11 is only large enough for the eye 22 to pass through. When the line 25 is pulled on, the member 19 will be pulled forwardly and when pressure on the line 25 is released, the coil spring 21 will push the member 19 rearwardly so as to give the lure the live swimming and crawling motion. The flanges 14 may be suitably decorated or colored so as to provide a striking effect for the body of the lure. The parts can be readily disassembled or assembled so that in the event that moss, weeds or the like become entangled, they can be readily cleaned or removed therefrom or untangled from the lure.

Minor changes in shape, size and rearrangement of details coming within the field of invention claimed may be resorted to in actual practice, if desired.

I claim:

1. In a fishing lure, a body member including an upper portion provided with an integral stabilizing rib thereon, a plurality of spaced parallel flanges depending from said upper portion, said body member further including a front end provided with an inclined spoon, there being registering openings in said flanges and said front end, a cylindrical core extending through the openings in said flanges and into engagement with the opening in said front end, a fish hook connected to the rear end of said core, a pin extending forwardly from said core, said pin having an eye on its front end, and a coil spring circumposed on said pin, so that with a fishing line connected to the eye on the front end of the pin, a pull on the fishing line will move the core forwardly in the body member to compress the spring and upon release of the fishing line the expansion of the spring will move the core rearwardly.

2. In a fishing lure, a body member including an upper portion provided with an integral stabilizing rib thereon, a plurality of spaced parallel flanges depending from said upper portion, said body member further including a front end provided with an inclined spoon, there being registering openings in said flanges and said front end, a cylindrical core extending through the openings in said flanges and into engagement with the opening in said front end, a fish hook connected to the rear end of said core, a pin extending forwardly from said core, said pin having an eye on its front end, and a coil spring circumposed on said pin, so that with a fishing line connected to the eye on the front end of the pin, a pull on the fishing line will move the core forwardly in the body member to compress the spring and upon release of the fishing line the expansion of the spring will move the core rearwardly, a shoulder on the front end of said body member providing an abutment for the forward end of said spring, there being a slot in said shoulder for the projection therethrough of said pin.

3. In a fishing lure, a body member including an upper portion having a plurality of spaced parallel flanges depending therefrom, said flanges having registering openings therein, a core mounted for sliding movement in the registering openings in said flanges and movably connected to said body member, said flanges being spaced apart to permit the entrance of water therebetween to lubricate said core, a fish hook connected to said core, and a pin connected to the front of the core for engagement with a fishing line so that a pull on said line will move said core forwardly in said body member and the release of said line will cause the core to move rearwardly in said body member.

4. The structure as defined in claim 3 and further including a downwardly inclined spoon on the front end of the body member.

5. The structure as defined in claim 3 and further including an integral stabilizing rib on the upper portion of said body member extending longitudinally thereof.

6. The structure as defined in claim 3 having in the front end of said body member an opening that is in registration with the openings in said flanges, and a spring mounted on said pin within the opening in the body member and adapted to urge said core rearward upon release of the fishing lure.

References Cited in the file of this patent
UNITED STATES PATENTS

| | | |
|---|---|---|
| 1,538,658 | Rindt | May 19, 1925 |
| 2,153,489 | Whitis | Apr. 4, 1939 |
| 2,791,859 | Wentworth | May 14, 1957 |